United States Patent [19]

Fadgen, Jr. et al.

[11] 3,871,889

[45] Mar. 18, 1975

[54] ACTIVATOR SOLUTIONS, THEIR PREPARATION, AND USE IN ELECTROLESS PLATING OF SURFACES

[75] Inventors: Earl J. Fadgen, Jr., Clinton; Juan Hajdu, Orange, both of Conn.

[73] Assignee: Enthone, Inc., West Haven, Conn.

[22] Filed: Oct. 29, 1973

[21] Appl. No.: 410,645

[52] U.S. Cl. .................................................... 106/1

[51] Int. Cl. .............................................. C23c 3/00

[58] Field of Search ......................... 106/1; 252/79.4

*Primary Examiner*—Lewis T. Jacobs

*Attorney, Agent, or Firm*—Roger J. Drew; Elwood J. Schaffer

[57] ABSTRACT

Surfaces intended to be electrolessly metal plated, for instance the surfaces of through holes of through hole printed circuit boards, are treated with a colloidal catalyst metal-free acid liquid solution of a soluble, lower alkanolmodified noble metal-tin chloride complex until the surface is rendered catalytic. The noble metal of the complex is a noble metal which is catalytic to the deposition of the metal destined to be electrolessly plated on the surface.

35 Claims, No Drawings

ACTIVATOR SOLUTIONS, THEIR PREPARATION, AND USE IN ELECTROLESS PLATING OF SURFACES

BACKGROUND OF THE INVENTION

1. Field of the Invention

This invention relates to electroless metal plating and more particularly to a process for the chemical reduction deposition of metal coatings on surfaces involving a new and improved catalytic activation of the surface or surfaces prior to the chemical reduction metal deposition. Additionally this invention relates to new and improved catalyst solutions which are substantially free of collodial metal particles, and to a method for preparing the catalyst solutions.

2. Description of the Prior Art

Prior activation systems for electroless metal deposition consisted of separate solutions of a stannous salt, e.g. stannous chloride, and a noble metal salt, e.g. palladous chloride. The stannous salt solution and noble metal salt solution were true solutions, and the activation was a two step process with separate application of the stannous salt solution followed by application of the palladous salt solution with water rinsing between steps. Colloidal tin and colloidal silver-containing baths have also been used as activation systems for electroless metal plating. Combination colloidal catalyst systems of noble metal salts and tin salts have also been used heretofor for activation substrates for electroless metal plating. The colloidal activation or catalyst systems referred to above, although giving good results in certain respects, leave room for improvement from the standpoint of stability of the colloidal catalyst-containing baths and effectiveness in catalyzing the surface or surfaces intended to be electrolessly metal plated. Thus the colloidal activator or catalyst system have colloidal catalyst particles of such large size that contacting and catalyzing of certain surface or surfaces intended to be electrolessly metal plated tends to be impossible, for example in penetrating, contacting and activating the surfaces of narrow, deep recesses such as those often found in multi-layer printed circuit boards and the surfaces of small holes, especially small blind holes, and crevices encountered in plating other plastics.

U.S. Pat. No. 3,011,920 discloses the use of a liquid containing colloidal particles of the catalytic metal dispersed therein for activating a surface for electroless deposition of metal thereon. The colloidal catalyst sol is obtained by admixing a noble metal salt, a tin salt, and a hydro-halide acid. Although the colloidal catalyst sol gives satisfactory results for activation, the colloidal catalyst sol leave appreciable room for improvement in activating the surfaces of printed circuit boards, due to the colloidal catalyst particles being of such large size as to prevent the particles from penetrating and hence contacting and activating the surfaces of the narrow, deep recesses. The colloidal catalyst sol of U.S. Pat. No. 3,011,920 also leaves room for improvement from the standpoint of inherent stability of the catalyst or activator composition.

The colloidal catalyst sols and baths of the prior art also leave room for improvement with regard tolerance to "dragged in" $CrO_3$— and $H_2SO_4$—containing aqueous conditioner solution. The plastisol-coated plated racks employed in the plating cycle tend to have cracks, fissures and pores in the plastisol, especially after the racks are older and have been in use for an appreciable time, and the conditioning solution may be retained in the cracks, fissures and pores and consequently dragged in to the activator bath despite water rinsing after the conditioning and prior to immersion of the racked articles to be plated into the activator bath. The presence of the dragged in $CrO_3$— and $H_2SO_4$—-containing conditioner solution in the prior colloidal catalyst sols and baths may result in a premature or quite early decomposition of the colloidal catalyst or activator sol to the extent that it will no longer function to effectively catalyze the article surface or surfaces to be electrolessly metal plated.

Moreover, use of the colloidal cataylst sol of U.S. Pat. No. 3,011,920 in the plating cycle requires a special post-activation treatment of the catalyzed article surface or surfaces with a post-activation solution which may be hazardous as hereafter disclosed, to remove protective colloid and/or deflocculating agent from the deposited colloidal catalytic metal particles. The post-activation solution employed for this special post-activation treatment may contain perchloric acid, and such post-activator solution could present an explosion and fire hazard due to the perchloric acid undergoing a spontaneous and explosive decomposition under certain conditions.

Catalyst solutions containing a soluble Lewis base-modified noble metal-tin halide complex and free or substantially free of colloidal catalyst metal are disclosed and claimed in U.S. Pat. No. 3,767,583, assigned to the common assignee. Although such catalyst solutions of U.S. Pat. No. 3,767,583 constitute an improvement in certain respects over the colloidal catalyst sol of the prior art for catlyzing surfaces destined to be electrolessly metal plated and are eminently suited for use in plating on plastics generally, the catalyst solutions of U.S. Pat. No. 3,767,583 leave room for improvement in catalyzing the walls of the through holes of through hole printed circuit boards and of multi-layer printed circuit boards. A portion or portions of the surface area of the through hole walls were usually not activated using the catalyst solution of U.S. Pat. No. 3,767,583, and consequently these non-activated surface portions of the through walls were not metal plated and hence not rendered electrically conductive during the subsequent electroless metal plating step.

BRIEF SUMMARY OF THE INVENTION

It has now been found in accordance with the present invention that by a close control of the molar ratio of stannous chloride to noble metal chloride utilized in the preparation of the soluble lower alkanol-modified noble metal-tin halide complex disclosd in the aforementioned U.S. Pat. No. 3,767,583; as well as by utilizing higher reaction temperatures in the preparation of such alkanol-modified noble metal-tin halide complex than was utilized in the preparation of the complexes of aforementioned U.S. Pat. No. 3,767,583, catalyst solutions containing a soluble lower alkanol-modified noble metal-tin chloride complex are obtained which are especially well adapted for catalyzing for chemical reduction metal plating the walls of through-holes of both single layer and multi-layer printed circuit boards. Additionally the catalyst solutions of this invention are well adapted for catalyzing the surfaces of other plastics for chemical reduction metal plating, and are stable catalyst solutions. The molar ratio of stannous chloride to noble metal chloride (calculated as palladium chloride) utilized in the preparation of the catalyst solutions herein should intially be at least abut 9–10:1 of stannous chloride to noble metal chloride (calculated as palladium chloride) respectively, and the reaction temperature should be about 160°F. or higher but below that temperature at which an excessive amount of noble metal is precipitated. By "Excessive amount" of noble metal being precipitated as used herein is meant the precipitation from solution of more than 15 percent by weight of the noble metal. By "lower alkanol" as used herein is meant a 1–4C inclusive alkanol singly or a mixture of two or more 1–4C alkanols.

The catalyst solutions of this invention are prepared by mixing together the lower alkanol, the soluble noble metal chloride, stannous chloride and hydorchloric acid, and maintaining the thus-obtained liquid mixture at a reaction temperature of at least about 160°F. but below that temperature at which an excessive amount of noble metal is precipitated for a time sufficient to obtain the soluble lower alkanol-modified noble metal-tin chloride complex. The stannous chloride is present in the reaction mixture in excess of the amount thereof required to reduce the noble metal chloride to zero valent noble metal and the lower alkanol is present in the reaction mixture in amount sufficient to obtain a soluble complex. The initial molar ratio of stannous chloride to noble metal chloride (calculated as palladium chloride) is essentially about 9–10:1 or higher respectively. The catalyst solution of this invention usually has a pH less than 1.

The minimum ratio of stannous chloride to noble metal chloride (calculated as palladium chloride) of about 9–10:1 respectively is critical herein for the reasons that at a molar ratio of stannous chloride to noble metal chloride (calculated as palladium chloride) appreciably below 9–10:1 respectively, a material portion of the reaction product complex will precipitate from the solution. This is undesirable and uneconomical because the noble metal of the precipitated complex is no longer available as catalyst for activating non-conductive surfaces for chemical reduction metal plating, for instance the walls of through holes of single layer and multi-layer printed circuit boards. The upper limit of the molar ratio of stannous chloride to noble metal chloride (calculated as palladium chloride), is not especially critical and can be varied over a wide range.

The minimum reaction temperature of about 160°F. is critical for the reason at reaction temperatures much below 160°F. the resultant catalyst solutions containing a soluble lower alkanol-modified palladium-tin complex are not sufficiently catalytic to ensure complete chemical reduction metal plating the walls of through-holes of both single and multi-layer printed circuit boards.

The period of maintaining the reaction mixture at the temperature of about 160°F. or higher to obtain the soluble lower alkanol-modified noble metal-tin chloride complex herein is a non-lengthy period as compared with the plural day holding period of the preparation method of U.S. Pat. No. 3,767,583, and is at least about 1½ hours in duration and sufficient to obtain the soluble complex.

In another embodiment of the invention and which is a preferred embodiment, the lower alkanol is supplied to the reaction mixture in amount which is sufficient to obtain the soluble alkanol-modified noble metal-tin chloride complex, but which is an insufficient amount of the lower alkanol to result in excessive gas pressure build-up in the marketing or transporting closed container for such complex. By eliminating excessive gas pressure building up in the closed marketing containers, venting of the containers required with the catalyst solutions disclosed and claimed in the aforementioned U.S. Pat. No. 3,767,583 is no longer required. Furthermore, the elimination of the excessive gas pressure build-up enables the catalyst solutions of this invention to be shipped by air, which could not be done with the catalyst solutions of aforementioned U.S. Pat. No. 3,767,583.

The noble metal of the complex is a noble metal that is catalytic to the electroless, i.e. chemical reduction, metal plating of the particular metal or metals in the case of alloy plating, destined to be electrolessly plated on the surface or surfaces. The treatment of the surface or surfaces with the solution of soluble lower alkanol-modified-noble metal-tin halide complex is usually by immersing the surface or surfaces in the solution, although any other suitable means of applying the solution onto the surface or surfaces could be utilized, if desired. The thus-obtained catalytically active surface is then electrolessly metal plated to deposit or plate the desired metal or metals on the treated surface or surfaces.

The catalyst solution of the present invention is a colloidal catalyst metal particle-free acid liquid solution containing a soluble lower alkanol-modified noble metal-tin chloride complex. The catalyst solution can be a concentrate solution or a concentrate solution which has diluted with an aqueous liquid, usually water, and a hydrogen halide acid, such as hydrochloric acid, prior to use.

The formation of the soluble lower alkanol-modified noble metal-tin chloride complex of this invention is indicated when the resulting acid solution of the reaction product either as such or when diluted as hereafter disclosed, is catalytically effective for catalyzing the object surface or surfaces to be electrolessly metal plated. By such term "catalytically effective" is meant the acid solution as such or when diluted as hereafter disclosed of the soluble lower alkanol-modified complex of this invention will convert an otherwise non-catalytic or substantially non-catalytic object surface or surfaces intended to be electrolessly metal plated into a catalytic surface or surfaces, upon immersion of the non-catalytic surface or surfaces therein for a sufficient immersion time as is hereinafter disclosed, which will result in a satisfactory metal plate or deposit being deposited on the thus-obtained catalytic surface or surfaces upon immersion of such catalytic surface or surfaces in an electroless or chemical reduction metal plating bath, for instance a chemical reduction copper or nickel plating bath, for a time sufficient to deposit the metal on the catalytic surface.

The thus-obtained solution of the lower alkanol-modified noble metal-tin chloride complex in the hydro-halide acid is utilizable as such as an activator for catalyzing the article surface or surfaces to be electrolessly metal plated. However, for economic reasons we recommend dilution of such acid solution, which is a concentrate solution, prior ro use, for instance by mixing together, by volume, 2 parts of such concentrate solution, 1 part of HCl (Analytic Reagent grade) of 37% HCl concentration, and 5 parts of deionized or distilled water.

The lower alkanol is essential for forming the soluble complex herein inasmuch as in the absence of the lower alkanol a soluble complex is not obtained and instead a colloidal sol is formed. Thus when a lower alkanol was omitted in the preparation of the complex, insoluble, collodial catalyst particles and a colloidal sol was obtained.

Although we do not wish to be bound by theory, it is believed that the mechanism involved in the formation of the soluble lower alkanol-modified noble metal-tin halide complex herein is an initial acid-catalyzed reduction of the ionic noble metal by the stannous chloride to zero valent noble metal. The lower alkanol, e.g. methanol, then forms a complex or coordination compound with the noble metal and stannous chloride. A molecular rearrangement or ligand transfer subsequently occurs which is inhibited by the lower alkanol quite probably due to steric blocking mechanisms. The soluble complex molecule formed is ionic and specifically anionic. It is further believed that the higher reaction temperature employed in preparing the soluble complex herein results in an increased yield of catalytically active species of complex over catalytically inactive species, by reason of the reaction or reactions not stopping at intermediate inactive species as much as apparently occurs at the lower reaction temperatures of U.S. Pat. No. 3,767,583. This is believed to explain at least in part the considerable improvement of the catalyst solutions of this invention over those of U.S. Pat. No. 3,767,583 for catalyzing the through hole wall surfaces of single layer and multi-layer printed circuit boards.

The 1–4 C alkanols herein include methanol, ethanol, isopropanol, n-propanol and n-butanol. So far as we are aware, any soluble noble metal chloride is utilizable herein. Exemplary of noble metal chlorides utilizable herein are chlorides of platinum group metals, e.g. palladium chloride, platinum chloride and aurous chloride. Chlorides of other platinum group metals utilizable herein are chlorides of rhodium, ruthenium, osmium and irridium dichloride, osmium trichloride, rhodium trichloride and ruthenium tetrachloride. The particular soluble noble metal chloride utilized of course will correspond to the particular noble metal desired in the complex.

The lower alkanol should be present in the reaction mixture at the outset of the redox reaction between the stannous chloride and noble metal chloride, to prevent the formation of an insoluble, relatively high molecular weight colloidal system and the precipitating out of zero valent noble metal.

The activator concentrate solutions and diluted concentrate solutions are acid solutions and usually have a pH below about 1.

DESCRIPTION OF THE PREFERRED EMBODIMENTS

The preferred lower alkanol is methanol.

The preferred reaction temperature for forming the lower alkanol-modified noble metal-tin chloride complex is in the range of about 160°F. to about 185°F. More preferably, the reaction temperature is in the range of about 170°F. to about 185°F.

The preferred period of maintaining the reaction mixture at the temperature of 160°F. or higher is at least about 4–9 hours and sufficient to obtain the soluble lower alkanol-modified-noble metal-stannous chloride complex, more preferably about 9 hours and sufficient to obtain the soluble complex.

Preferably, as the reaction temperature is increased, the molar ratio of stannous chloride to noble metal chloride (calculated as palladium chloride) is increased in preparing the catalyst solution of this invention. Thus at a reaction temperature of 160°F. up to 170°F., the molar ratio of stannous chloride to noble metal chloride (calculated as palladium chloride) is preferably in the range of about 9.0–10.0:1 respectively; at a reaction temperature of 170°F. to 175°F., the molar ratio of stannous chloride to noble metal chloride (calculated as palladium chloride) is preferably in the range of about 9.5–10.5:1 respectively; at a reaction temperature of 175°F. to 180°F. the molar ratio of stannous chloride to noble metal chloride (calculated as palladium chloride) is preferably in the molar ratio range of about 11.0–11.7:1 respectively; and at a reaction temperature of 180°F. to 185°F., the molar ratio of stannous chloride to noble metal chloride (calculated as palladium chloride) is preferably in the molar ratio range of about 11.7–12.0:1 respectively.

The lower alkanol is preferably added in the formation of the reaction mixture before addition of the acid-soluble noble metal chloride. If the lower alkanol is not present at the outset of the redox reaction between the stannous chloride and noble metal chloride, this redox reaction, which occurs rapidly, may result in the zero valent noble metal resulting from the redox reaction either forming an insoluble, relatively high molecular weight colloidal system and/or precipitating out.

The lower alkanol is preferably added to the reaction mixture in amount in the range of about 0.5–2.5% by volume (based on total reaction mixture).

The soluble stannous chloride reactant is preferably added to the reaction mixture in the preparation of the soluble lower alkanol-modified noble metal-tin chloride complex herein in increments, for instance three or four or more increments, with mixing of the resulting mixture between the increment additions. The water-soluble stannous chloride is preferably in solution in an aqueous hydrochloric acid solution for each increment addition. An amount of stannous chloride is preferably added in the first incremental addition which is in excess of the amount stoichiometrically required to reduce all noble metal salt to zero valent noble metal. The additional incremental additions of the soluble stannous chloride are sufficient in size and number to provide an amount of stannous halide in the reaction mixture which is sufficient to apparently slowly promote a slight increase in molecular size of the complex to a species capable of catalyzing the chemical reduction deposition of a metal or metals to be electrolessly plated. The temperature of the reaction mixture during the mixing between the incremental additions of stannous chloride is preferably in the range of about 160°F. to about 185°F., more preferably about 170°F. to about 185°F. The reaction temperature can be maintained within such temperature ranges by supplemental heating from an external source and/or by cooling, as required.

The lower alkanol is preferably added to the reaction mixture prior to the addition of the noble metal chloride as previously disclosed herein and is added in amount which is at least sufficient to prevent an insoluble relatively high molecular weight colloidal catalyst system from forming and a zero valent noble metal from precipitating.

Preferably an alkali stannate, for example an alkali metal stannate, e.g. sodium or potassium stannate, is added to the reaction mixture prior to the addition of the stannous chloride to facilitate the reaction.

The preferred noble metal chloride reactant is palladium chloride.

The reaction medium for forming the soluble lower alkanol-modified noble metal-tin chloride complex is an acid aqueous medium preferably of a pH below about 1. The acid pH of the reaction mixture or medium is maintained by the addition of hydrochloric acid.

An especially preferred method of preparing the soluble lower alkanol-modified noble metal-tin chloride complex is by introducing water and a soluble alkali metal stannate, e.g. sodium stannate into a reaction vessel or zone, and agitating or stirring the resulting mixture until the alkali metal stannate is dissolved in the water. A liquid solution containing stannous chloride and hydrochloric acid is added to the thus-obtained liquid aqueous solution and the resulting mixture agitated or stirred for typically about 10 minutes. Hydrochloric acid is then added to the thus-obtained liquid mixture, followed by the addition of the lower alkanol to the resulting liquid mixture. The resulting liquid mixture is heated to a reaction temperature in the range of about 170°F. to about 185°F. while agitating or stirring the same, a controlled or metered amount of a liquid solution of palladium chloride in hydrochloric acid is added to the thus-obtained liquid mixture, and a solution of stannous chloride in hydrochloric acid is added in three increments which are substantially equal in size and concentration to the resulitng liquid mixture. The pH of the reaction mixture is maintained below pH during and after the addition of the palladium chloride solution thereto. The incremental addition of the stannous chloride solution in hydrochloric acid to the liquid mixture is usually made during the slow addition of the solution of palladium chloride in hydrochloric acid to the liquid mixture as disclosed immediately supra. Hydrochloric acid and stannous chloride are then separately added to the thus-obtained liquid mixture, with the stannous chloride being added slowly to such liquid mixture. Prior to such separate additions of hydrochloric acid and stannous chloride, the temperature of the resulting liquid mixture is maintained at a reaction temperature in the range of about 170°F. to about 185°F. for a period of about 4 hours or more and sufficient to obtain a catalytically effective solution containing the soluble lower alkanol-modified noble metal-tin chloride complex. The liquid mixture is then agitated or stirred for about 5 hours or longer, and the thus-obtained liquid mixture is cooled to room temperature, without agitation of the mixture, i.e. in a quiescent state, preferably by being permitted to cool to room temperature. The product catalytically effective solution containing the soluble lower alkanol-modified noble metal-tin chloride complex can be utilized or packaged in suitable marketing drums or other suitable containers.

The agitating or stirring in the preparation method set forth immediately supra can be effected with any suitable agitator means or stirrer.

The article or substrate surface or surfaces to be plated, if not already clean, are cleaned, for instance by immersion in a conventional hot non-silicated alkaline cleaner solution. However, any suitable means of cleaning the surface can be utilized including mechanical cleaning, such as for example by sanding or abrading. The surface or surfaces are then rinsed in water. Following the rinsing, the surface or surfaces to be plated may then be dipped in a dilute acid solution, e.g. an aqueous HCl solution of 20% HCl concentration, to neutralize any alkaline material remaining, followed by water rinsing the thus-treated surface or sufaces.

The thus-treated substrate surface or surfaces are then catalyzed by immersing the surface or surfaces in the colloidal metal particle-free liquid activator solution of the soluble lower alkanol-modified noble metal-tin chloride complex of this invention and specified in Example 1 for a time sufficient to render the surface or surfaces catalytically active, usually a time of 1 minute or more. Alternatively and less preferably such solution of soluble lower alkanol-modified noble metal-tin chloride complex can be sprayed onto the surface or surfaces to be catalyzed. The thus-obtained catalyzed surface or surfaces are then withdrawn from the activator or catalyst solution and ordinarily rinsed in water.

The catalyzed surface or surfaces are then ordinarily contacted with, usually by immersing in, a post-activation solution, preferably a dilute solution of HCl (10–25% HCl concentration), for a contact time which is sufficient to assure exposure of catalytic noble metal on the surface or surfaces, usually 1 minute or longer, followed by ordinarily rinsing in water. The contacting with the post-activation assures exposure of the catalytic noble metal on the surface or surfaces.

Any solution capable of assuring exposure of the catalytic noble metal on the surface or surfaces to be electrolessly metal plated can be utilized as the post-activation solution, although the dilute HCl solution is preferred as previously disclosed herein. Although we do not wish to be bound by theory, it is believed that the post-activation solution treatment functions to remove material such as, for instance, excess tin from the treated surface or surfaces thereby exposing catalytic noble metal. However another explanation advanced is that the post-activation solution treatment renders material other than the catalytic noble metal on the treated surface or surfaces incapable of detrimentally interfering with the catalytic activity of the noble metal.

The catalytic surface or surfaces are then electrolessly metal plated by contacting the catalyzed surface or surfaces, usually by immersing such surface or surfaces in, a chemical reduction metal plating solution for plating the desired metal, for example a chemical reduction copper plating solution, a chemical reduction nickel plating solution, a chemical reduction cobalt plating solution, or a chemical reduction cobalt-nickel plating bath for depositing cobalt-nickel alloys. The catalyzed surface or surfaces is contacted with the chemical reduction metal plating solution until a metal plate or layer of the desired thickness is deposited on the surface or surfaces. The thus-plated surface or surfaces are then rinsed with water. Exemplary of the chemical reduction aqueous metal plating baths are the copper, nickel, cobalt and cobalt-nickel plating baths which follow:

Chemical Reduction Copper Plating Bath

| | g/l |
|---|---|
| Copper sulfate | 29 |
| Sodium carbonate | 25 |
| Rochelle salt | 140 |
| Versene T | 17 |
| Sodium hydroxide | 40 |
| Formaldehyde (37% solution) | 166 |

"Versene T" is a trademarked material obtained in commerce and cotaining EDTA and triethanolamine. The bath is operated at a bath temperature of 70°F. and has a pH before plating of 11.5.

Chemical Reduction Nickel Plating Bath

| | g/l |
|---|---|
| Nickel chloride | 30 |
| Sodium citrate | 20 |
| Ammonium chloride | 50 |
| Sodium hypophosphite | 10 |
| Ammonium hydroxide | 30 |

The pH of the bath is adjusted to 8–10 with $NH_4OH$, and the bath is operated at a bath temperature of 70°–110°F.

Chemical Reduction Cobalt Plating Bath

| | g/l |
|---|---|
| Cobalt chloride | 30 |
| Sodium citrate | 35 |
| Ammonium chloride | 50 |
| Sodium hypophosphite | 20 |

The pH of the bath is adjusted to 9–10 with ammonia, and the bath is operated at a temperature of 195°–205°F.

Chemical Reduction Cobalt-Nickel Plating Bath

| | g/l |
|---|---|
| Cobalt chloride | 30 |
| Nickel chloride | 30 |
| Rochelle salt | 200 |
| Ammonium chloride | 50 |
| Sodium hypophosphite | 20 |

The pH of the bath is adjusted to 8–10 with ammonia and the bath is operated at a temperature of 195°–205°F.

After the electroless plating is completed, the substrate surface or surfaces are usually then elecotroplated with the desired metal, for example, copper. A typical electroplating bath for this purpose is an acid sulfate aqueous bath containing 100-300 g/l of $CuSO_4.5H_2O$ and 15–40 g/l of free $H_2SO_4$ (66°Be). An additional metal or metals can then be electroplated over such electroplate layer, if desired.

The following examples are given by way of illustration but not by way of limitation:

EXAMPLE 1

Two-hundered and eighty-nine and four-tenth (289.4) lbs. of distilled water was introduced into a tank equipped with a stirrer and a Teflon steam coil. With the agitator turned on, 1410.3 grams of sodium stannate was added to the water in the tank and stirred until dissolved. 75.22 lbs. of an addition solution containing 29.76% of stannous chloride and 70.24% of hydrochloric acid (A R grade) were then added to the resulting solution and the thus-obtained solution stirred for 10 minutes. 363.22 lbs. of hydrochloric acid (A R grade) was then added to the resulting solution, after which the temperature controller was set to 170°F. and the steam for heating then turned on. 7070 mls. of methanol (A R grade) was then added to the resulting solution in the tank while heating and stirring the solution. The heating and stirring of the solution in the tank was continued until the temperature of the solution reached 170°F. Addition of a palladium chloride solution to the thus-obtained solution in this tank was then begun with use of a metering pump, with the metering pump adjusted for 3 gallons per hour. The palladium chloride solution contained, by weight, 0.30% of palladium chloride and 99.70% of hydrochloric acid (A R grade). At 1 hour, 2 hours and 3 hours after beginning the addition of the palladium chloride solution, a separate increment 20.8 lbs. in size of a stannous chloride solution containing, by weight, about 30% of stannous chloride and 70% of hydrochloric acid (A R grade) was added to the thus-obtained solution. At four hours after beginning the addition of the palladium chloride solution, 246.6 lbs. of hydrochloric acid (A R grade) was added to the resulting solution and 82.7 lbs. of stannous chloride was separately and slowly added to the resulting solution. Stirring of the solution was continued for 5 hours, after which the stirrer and heat was shut off. The thus-obtained liquid mixture was held in the tank overnight, and the next morning stirred for 15 minutes and then packaged.

The thus-obtained liquid solution containing the methanol-modified palladium-tin chloride complex can be utilized as such as an activator. It is also adapted to be mixed together with an aqueous liquid solvent, usually water, and hydrochloric acid prior to use, and it is preferably so diluted prior to use and typically by mixing together the thus-obtained liquid solution or concentrate, hydrochloric acid, and purified water in the proportions of 0.5 gallon of HCl (A R grade of 37% HCl concentration) and 4 gallons of the water per gallon of the thus-obtained liquid solution concentrate. Such a diluted activator solution gave good results in catalyzing the walls of the through holes of single layer and multi-layer printed circuit boards for subsequent electroless metal plating at room temperature of the activator solution and an immersion time in the activator solution of 5–6 minutes. The through hole walls of both types of boards were electrolessly plated with a continuous, firmly adherent layer of copper after being catalyzed by immersion in such diluted activator solution.

On the contrary, use of the activator solution containing the methanol-modified noble metal-tin halide complex disclosed and claimed in aforementioned U.S. Pat. No. 3,767,583 which had been diluted with hydrochloric acid (A R of 37% HCl concentration) and purified water in substantially identical manner, for catalyzing the through hole walls of the single layer and multilayer printed circuit boards resulted in undesirable discontinuous deposits of copper thereon after the electroless copper plating.

EXAMPLE 2

The procedure of Example 1 was repeated except that isopropanol was subsitituted for methanol in this Example 2.

The resulting liquid solution containing the isopropanol-modified palladium-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 2 under substantially the same conditions as in Example 1, results in a continuous firmly adherent copper deposit on the through hole walls.

EXAMPLE 3

The procedure of Example 1 is repeated except that n-butanol was substituted for methanol in this Example 3.

The resulting liquid solution containing the n-butanol-modified palladium-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 3 under substantially the same conditions as in Example 1, results in a continuous, firmly adherent copper deposit on the through hole walls.

EXAMPLE 4

The procedure of Example 1 is repeated except that ethanol is substituted for methanol in this Example 4.

The resulting liquid solution containing the ethanol-modified palladium-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 4 under substantially the same conditions as in Example 1, results in a continuous, firmly adherent copper deposit on the through hole walls.

EXAMPLE 5

The procedure of Example 1 is repeated except that platinum chloride ($Pt Cl_2$) is substituted for palladium chloride in this Example 5.

The resulting liquid solution containing the methanol-modified platinum-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 5 under substantially the same conditions as in Example 1, results in a continuous, firmly adherent copper deposit on the through hole walls.

EXAMPLE 6

The procedure of Example 1 is repeated except that aurous chloride (Au Cl) is substituted for palladium chloride in this Example 6.

The resulting liquid solution containing the methanol-modified gold-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 6 under substantially the same conditions as in Example 1, results in a continuous, firmly adherent copper deposit on the through hole walls.

EXAMPLE 7

The procedure of Example 1 is repeated except that platinum chloride ($Pt Cl_2$) and isopropanol are substituted for palladium chloride and methanol respectively in this Example 7.

The resulting liquid solution containing the isopropanol-modified platinum-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 7 under substantially the same conditions as in Example 1, results in a continuous, firmly adherent copper deposit on the through hole walls.

EXAMPLE 8

The procedure of Example 1 is repeated except that platinum chloride ($Pt Cl_2$) and ethanol are substituted for palladium chloride and methanol respectively in this Example 8.

The resulting liquid solution containing the ethanol-modified platinum-tin chloride complex gives good results, either as such as a concentrate or when diluted with hydrochloric acid and water in a similar ratio as is set forth in Example 1 herein, for catalyzing the through hole walls of both single layer and multi-layer printed circuit boards for electroless metal plating. Electroless copper plating of the through hole wall surfaces of both types of circuit boards, which have been activated by immersion in the activator solution of this Example 8 under substantially the same conditions as in Example 1, results in a continuous, firmly adherent copper deposit on the through walls.

EXAMPLE 9

The procedure of Example 1 is repeated except that platinum chloride ($Pt Cl_2$) and n-butanol are substituted for palladium chloride and methanol respectively in this Example 9.

The resulting liquid solution containing the n-butanol-modified platinum-tin chloride complex gives good results, either as such as a concentrate or when diluted with hydrochloric acid and water in a similar ratio as is set forth in Example 1 herein, for catalyzing the through hole walls of both single layer and multilayer printed boards for electroless metal plating. Electroless copper plating of the through hole wall surfaces of both type of circuit boards, which have been activated by immersion in the activator solution of this Example 9 under substantially the same conditions as in Example 1, results in a continuous, firmly adherent copper deposit on the through hole walls.

EXAMPLE 10

The procedure of Example 1 is repeated except that aurous chloride (Au Cl) and isopropanol are substituted for palladium chloride and methanol respectively in this Example 10.

The resulting liquid solution containing the isopropanol-modified gold-tin chloride complex gives good results, either as such as a concentrate or when diluted with hydrochloric acid and water in a similar ratio as is set forth in Example 1 herein, for catalyzing the through hole walls of both single layer and multilayer printed circuit boards for electroless metal plating. Electroless copper plating of the through hole wall surfaces of both types of circuit boards, which have been activated by immersion in the activator solution of this Example 10 under substantially the same conditions as in Example 1, results in a continuous, firmly adherent copper deposit on the through hole walls.

What is claimed is:

1. A catalyst solution comprising a substantially colloidal metal particle-free acidic liquid solution containing a soluble lower alkanol-modified noble metal-tin chloride complex, and hydrochloric acid, the soluble lower alkanol-modified noble metal-tin chloride complex being obtained by mixing together a lower alkanol, a soluble noble metal chloride, stannous chloride and hydrochloric acid, and maintaining the thus-obtained liquid mixture at a reaction temperature of at least about 160°F. but below that temperature at which an excessive amount of noble metal is precipitated for a period sufficient to obtain a catalytically effective solution containing the soluble lower alkanol-modified noble metal-tin chloride complex, the stannous chloride being present in excess of the amount thereof required to reduce the noble metal chloride to zero valent noble metal, the molar ratio of stannous chloride to noble metal chloride (calculated as palladium chloride) being initially at least about 9-10:1 respectively, and the lower alkanol being present in amount sufficient to obtain a soluble complex.

2. The catalyst solution of claim 1 having a pH of less than 1.

3. The catalyst solution of claim 2 wherein the lower alkanol is methanol.

4. The catalyst solution of claim 3 wherein the reaction temperature is maintained in the range of about 160°F. to about 185°F.

5. The catalyst solution of claim 3 wherein the methanol is present in amount sufficient to obtain a soluble complex but insufficient to result in excessive by-product formation with attendant excessive gas pressure build-up in a closed container ultimately containing the catalyst solution.

6. The catalyst solution of claim 3 wherein the methanol is added in the formation of the reaction mixture prior to the addition of the noble metal chloride.

7. The catalyst solution of claim 1 wherein the mixture is maintained at the temperature of at at least about 160°F. but below that temperature at which an excessive amount of noble metal is precipitated for a period of at least about 4–9 hours and sufficient to obtain said soluble complex.

8. The catalyst solution of claim 1 wherein the mixture is maintained at the temperature of in the range of about 160°F. to about 185°F. for a period of at least about 9 hours and sufficient to obtain said soluble complex.

9. The catalyst solution of claim 4 wherein the methanol is added in the formation of the reaction mixture prior to the addition of the noble metal chloride.

10. The catalyst solution of claim 2 wherein the noble metal of the complex is palladium and the soluble noble metal chloride is palladium chloride.

11. The catalyst solution of claim 3 wherein the reaction temperature is maintained in the range of about 170°F. to about 185°F.

12. The catalyst solution of claim 2 wherein the stannous chloride is added in increments.

13. The catalyst solution of claim 2 wherein a soluble alkali stannate is mixed together with the lower alkanol, soluble noble metal chloride, stannous chloride and hydrochloric acid.

14. The catalyst solution of claim 13 wherein the alkali stannate is a soluble alkali metal stannate.

15. The catalyst solution of claim 14 wherein the alkali metal stannate is sodium stannate.

16. The catalyst solution of claim 2 wherein the soluble lower alkanol-modified noble metal-tin chloride complex is obtained by introducing water and a soluble alkali metal stannate into a reaction zone, agitating the resulting mixture until the alkali metal stannate is dissolved in the water, adding to the thus-obtained aqueous solution a solution containing stannous chloride and hydrochloric acid, agitating the resulting mixture, adding hydrochloric acid to the thus-obtained mixture, adding a lower alkanol to the thus-obtained mixture, heating the resulting mixture to a reaction temperature in the range of about 170°F. to about 185°C. while agitating said mixture, slowly adding at a controlled rate a solution of an acid-soluble noble metal chloride in hydrochloric acid to the thus-obtained mixture, adding to the resulting mixture increments of a solution of stannous chloride in hydrochloric acid, separately adding to the thus-obtained mixture hydrochloric acid and stannous chloride, maintaining the resulting mixture at a reaction temperature in the range of about 170°F. to about 185°F. for a period of at least about 9 hours and sufficient to obtain the soluble complex, agitating the resulting mixture, and cooling the thus-obtained mixture to room temperature.

17. A method for the preparation of a catalyst solution substantially free of colloidal metal particles which comprises mixing together a soluble noble metal chloride, a lower alkanol, stannous chloride and hydrochloric acid, and maintaining the thus-obtained mixture at a reaction temperature of at least about 160°F. but below that temperature at which an excessive amount of noble metal is precipitated for a period sufficient to obtain a catalytically effective solution containing the soluble lower alkanol-modified noble metal-tin chloride complex, the stannous chloride being present in excess of the amount thereof required to reduce the noble metal chloride to zero valent noble metal, the molar ratio of stannous chloride to noble metal chloride (calculated as palladium chloride) being at least about 9–10:1 respectively, and the lower alkanol being present in amount sufficient to obtain a soluble complex.

18. The method of claim 17 wherein the catalytically effective solution has a pH less than 1.

19. The method of claim 18 wherein the mixture is maintained at the temperature of at least about 160°F. but below that temperature at which an excessive amount of noble metal is precipitated for a period of at least about 4–9 hours and sufficient to obtain said soluble complex.

20. The method of claim 18 wherein the noble metal of the complex is palladium and the soluble metal chloride is palladium chloride.

21. The method of claim 18 wherein the lower alkanol is methanol.

22. The method of claim 18 wherein the stannous chloride is added in increments.

23. The method of claim 18 wherein a soluble alkali stannate is mixed together with the lower alkanol, soluble noble metal chloride, stannous chloride and hydrochloric acid.

24. The method of claim 23 wherein the alkali stannate is a soluble alkali metal stannate.

25. The method of claim 24 wherein the alkali metal stannate is sodium stannate.

26. A method for the preparation of a catalyst solution substantially free of colloidal metal particles which comprises introducing water and a soluble alkali metal stannate into a reaction zone, agitating the resulting mixture until the alkali metal stannate is dissolved in the water, adding to the thus-obtained aqueous solution a solution containing stannous chloride and hydrochloric acid, agitating the resulting mixture, adding hydrochloric acid to the thus-obtained mixture, adding a lower alkanol to the thus-obtained mixture, heating the resulting mixture to a reaction temperature in the range of about 170°F. to about 185°C. while agitating said mixture, slowly adding at a controlled rate a solution of an acid-soluble noble metal chloride in hydrochloric acid to the thus-obtained mixture, adding to the resulting mixture increments of a solution of stannous chloride in hydrochloric acid, separately adding to the thus-obtained mixture hydrochloric acid and a stannous chloride, maintaining the resulting mixture at a reaction temperature in the range of about 170°F. to about 185°F. for a period of at least about 9 hours and sufficient to obtain the soluble complex, agitating the resulting mixture, and cooling the thus-obtained mixture to room temperature.

27. A catalyst solution comprising a substantially colloidal metal particle-free acidic liquid solution containing a soluble methanol-modified noble metal-tin chloride complex, and hydrochloric acid, the catalyst solution having a pH of less than 1, the soluble methanol-modified noble metal-tin chloride complex being obtained by introducing water and a soluble alkali metal stannate into a reaction zone, agitating the resulting mixture until the alkali metal stannate is dissolved in the water, adding to the thus-obtained aqueous solution a solution containing stannous chloride and hydrochloric acid, agitating the resulting mixture, adding hydrochloric acid to the thus-obtained mixture, adding methanol to the thus-obtained mixture, heating the resulting mixture to a reaction temperature in the range of about 170°F. to about 185°F. while agitating said mixture, slowly adding at a controlled rate a solution of an acid-soluble noble metal chloride in hydrochloric acid to the thus-obtained mixture, adding to the resulting mixture increments of a solution of stannous chloride in hydrochloric acid, separately adding to the thus-obtained mixture hydrochloric acid and stannous chloride, maintaining the resulting mixture at a reaction temperature in the range of about 170°F. to about 185°F. for a period of at least about 9 hours and sufficient to obtain the soluble complex, agitating the resulting mixture, and cooling the thus-obtained mixture to room temperature, the stannous chloride being present in excess of the amount thereof required to reduce the noble metal chloride to zero valent noble metal, the molar ratio of stannous chloride to noble metal chloride (calculated as palladium chloride) being initially at least about 9–10:1 respectively, and the methanol being present in amount sufficient to obtain a soluble complex.

28. The catalyst solution of claim 27 wherein the noble metal is palladium, the noble metal chloride is palladium chloride, the alkali metal stannate is sodium stannate, and the cooling of the thus-obtained mixture is by permitting said mixture to cool to room temperature without agitation of the mixture, and thereafter agitating the thus-obtained solution for at least 15 minutes.

29. A method for the preparation of a catalyst solution substantially free of colloidal metal particles which comprises mixing together a soluble noble metal chloride, methanol, stannous chloride and hydrochloric acid, and maintaining the thus-obtained mixture at a reaction temperature in the range of about 160°F. to about 185°F. for a period sufficient to obtain a catalytically effective solution containing the soluble methanol-modified noble metal-tin chloride complex, the stannous chloride being present in excess of the amount thereof required to reduce the noble metal chloride to zero valent noble metal, the molar ratio of stannous chloride to noble metal chloride (calculated as palladium chloride) being at least 9–10:1 respectively, and the methanol being present in amount sufficient to obtain a soluble complex.

30. The method of claim 29 wherein the methanol is present in amount sufficient to obtain a soluble complex but insufficient to result in excessive by-product formation with attendant excessive gas pressure buildup in a closed container ultimately containing the catalyst solution.

31. The method of claim 29 wherein the methanol is added in the formation of the reaction mixture prior to the addition of the noble metal chloride.

32. A method for the preparation of a catalyst solution substantially free of colloidal metal particles which comprises mixing together a soluble noble metal chloride, methanol, stannous chloride and hydrochloric acid, and maintaining the thus-obtained mixture at a reaction temperature in the range of about 160°F. to about 185°F. for a period of at least about 9 hours and sufficient to obtain a catalytically effective solution containing the soluble methanol-modified noble metal-tin chloride complex, the stannous chloride being present in excess of the amount thereof required to reduce the noble metal chloride to zero valent noble metal, the molar ratio of stannous chloride to noble metal chloride (calculated as palladium chloride) being at least about 9–10:1 respectively, and the methanol being present in amount sufficient to obtain a soluble complex, the catalytically effective solution having a pH less than 1.

33. A method for the preparation of a catalyst solution substantially free of colloidal metal particles which comprises mixing together a soluble noble metal chloride, methanol, stannous chloride and hydrochloric acid, and maintaining the thus-obtained mixture at a reaction temperature in the range of about 160°F. to about 185°F. for a period sufficient to obtain a catalytically effective solution containing the soluble methanaol-modified noble metal-tin chloride complex, the methanol being added in the formation of the mixture prior to the addition of the noble metal chloride, the stannous chloride being present in excess of the amount thereof required to reduce the noble metal chloride to zero valent noble metal, the molar ratio of stannous chloride to noble metal chloride (calculated as palladium chloride) being at least about 9–10:1 respectively, and the methanol being present in amount sufficient to obtain a soluble complex.

34. A method for the preparation of a catalyst solutiton substantially free of colloidal metal particles which comprises mixing together a soluble noble metal chloride, methanol, stannous chloride and hydrochloric acid, and maintaining the thus-obtained mixture at a reaction temperature in the range of about 170°F. to about 185°F. for a period sufficient to obtain a catalytically effective solution containing the soluble methanol-modified noble metal-tin chloride complex, the stannous chloride being present in excess of the amount thereof required to reduce the noble metal chloride to zero valent noble metal, the molar ratio of stannous chloride to noble metal chloride (calculated as palladium chloride) being at least about 9–10:1 respectively, and the lower alkanol being present in amount sufficient to obtain a soluble complex, the catalytically effective solution having a pH less than 1.

35. A method for the preparation of a catalyst solution substantially free of colloidal metal particles which comprises introducing water and a soluble alkali metal stannate into a reaction zone, agitating the resulting mixture until the alkali metal stannate is dissolved in the water, adding to the thus-obtained aqueous solution a solution containing stannous chloride and hydrochloric acid, agitating the resulting mixture, adding hydrochloric acid to the thus-obtained mixture, adding methanol to the thus-obtained mixture, heating the resulting mixture to a reaction temperature in the range of about 170°F. to about 185°C. while agitating said mixture, slowly adding at a controlled rate a solution of an acid-soluble noble metal chloride in hydrochloric acid to the thus-obtained mixture, adding to the resulting mixture increments of a solution of stannous chloride in hydrochloric acid, separately adding to the thus-obtained mixture hydrochloric acid and a stannous chloride, maintaining the resulting mixture at a reaction temperature in the range of about 170°F. to about 185°F. for a period of at least about 9 hours and sufficient to obtain the soluble complex, agitating the resulting mixture, and cooling the thus-obtained mixture to room temperature.

* * * * *

UNITED STATES PATENT OFFICE

CERTIFICATE OF CORRECTION

Patent No. 3,871,889 Dated March 18, 1975

Inventor(s) Earl J. Fadgen, et al

It is certified that error appears in the above-identified patent and that said Letters Patent are hereby corrected as shown below:

Page 1, line 5 of ABSTRACT, "alkanolmodified" should read -- alkanol-modified --. Column 1, line 37, "system" should read -- systems --; line 66, "plated" should read -- plating --. Column 2, line 35, "catlyzing" should read -- catalyzing --. Column 3, line 9, "Excessive" should read -- excessive --; line 17, "hydorchloric" should read -- hydrochloric --. Column 4, line 65, "dillution" should read -- dilution --. Column 5, line 45, "irridium" should be deleted and the following substituted therefor -- iridium, e.g. iridium --. Column 6, line 47, "hydorchloric" should read -- hydrochloric --. Column 7, line 41, "litng" should read -- lting --; line 42, -- 1 -- should be inserted after "pH" and before "during". Column 8, line 56, -- with -- should be inserted after "surfaces" and before the comma. Column 9, line 59, "elecotro" should read -- electro --; line 62, "100" should read -- 200 --. Column 13, line 9, -- circuit -- should be inserted after "printed" and before "boards"; line 11, "type" should read -- types --. Column 17, line 28, "ton" should be changed to -- on --.

Signed and Sealed this

*Thirty-first* Day of *October 1978*

[SEAL]

*Attest:*

RUTH C. MASON
*Attesting Officer*

DONALD W. BANNER
*Commissioner of Patents and Trademarks*